(12) United States Patent
Poirier

(10) Patent No.: US 8,523,960 B2
(45) Date of Patent: Sep. 3, 2013

(54) STABLE ALKOXYLATED FATTY ACID ALKYL ESTERS FROM TRANSESTERIFICATION-ALKOXYLATION OF VEGETABLE OILS

(75) Inventor: Marc-André Poirier, Sarnia Onatario (CA)

(73) Assignee: Exxonmobil Research and Engineering Company, Annandale, NJ (US)

( * ) Notice: Subject to any disclaimer, the term of this patent is extended or adjusted under 35 U.S.C. 154(b) by 273 days.

(21) Appl. No.: 12/875,435

(22) Filed: Sep. 3, 2010

(65) Prior Publication Data

US 2011/0056122 A1    Mar. 10, 2011

Related U.S. Application Data

(60) Provisional application No. 61/275,949, filed on Sep. 4, 2009.

(51) Int. Cl.
*C10L 1/18* (2006.01)

(52) U.S. Cl.
USPC .......................................................... 44/401

(58) Field of Classification Search
USPC .......................................................... 44/401
See application file for complete search history.

(56) References Cited

U.S. PATENT DOCUMENTS

| | | | |
|---|---|---|---|
| 4,950,803 | A | 8/1990 | Smith, Jr. et al. |
| 5,003,124 | A | 3/1991 | Smith, Jr. et al. |
| 5,034,161 | A | 7/1991 | Alink |
| 5,426,199 | A | 6/1995 | Lundquist |
| 5,840,942 | A | 11/1998 | Oude Alink |
| 7,488,837 | B2 | 2/2009 | Tsuto et al. |
| 2007/0142690 | A1 | 6/2007 | Elomari |
| 2007/0167642 | A1 | 7/2007 | Oku et al. |
| 2009/0126262 | A1 | 5/2009 | Asthana et al. |

FOREIGN PATENT DOCUMENTS

| | | |
|---|---|---|
| EP | 1795576 | 6/2007 |
| EP | 1795576 A1 * | 6/2007 |
| JP | 06313188 | 11/1994 |
| WO | 2007/078592 A2 | 7/2007 |

* cited by examiner

*Primary Examiner* — Deborah D Carr
(74) *Attorney, Agent, or Firm* — David M. Weisberg; Bruce M. Bordelon

(57) ABSTRACT

Alkoxylated fatty acid alkyl esters are produced from a biocomponent feed, preferably containing triglycerides. The triglycerides can be reacted with an alcohol in the presence of an acidic catalyst to form alkoxylated fatty acid alkyl esters, which can provide improved low temperature properties and/or improved oxidative stability in petrochemical products, relative to non-alkoxylated versions of the fatty acid alkyl esters.

19 Claims, 1 Drawing Sheet

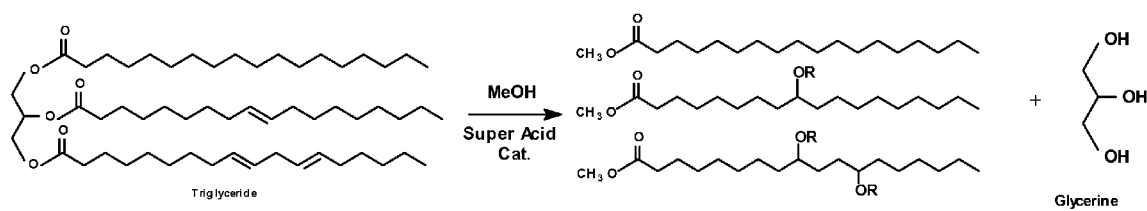

STABLE ALKOXYLATED FATTY ACID ALKYL ESTERS FROM TRANSESTERIFICATION-ALKOXYLATION OF VEGETABLE OILS

CROSS REFERENCE TO RELATED APPLICATION

This application claims the benefit of U.S. Application 61/275,949, filed Sep. 4, 2009.

FIELD OF THE INVENTION

This invention provides a process for the manufacture of alkoxylated diesel boiling range fuel product from bio-component feeds such as diglyceride- and/or triglyceride-containing feeds.

BACKGROUND OF THE INVENTION

Fuels based on bio-component sources will likely become increasingly prevalent in the future. Already, various governments have instituted current and future requirements that motor fuel pools contain a minimum percentage of fuel derived from a bio-component source, such as a plant, animal, fish, or algae based oil or fat.

One current technique for creating diesel range fuels from a bio-component feed is to convert triglycerides into fatty acid alkyl esters, such as fatty acid methyl esters (FAME), by transesterification. Typical products of a transesterification reaction are glycerol and fatty acid alkyl esters that roughly correspond to the fatty acid chains of the original triglycerides and to the alkyl alcohol(s) used for transesterification. The transesterification reaction can be catalyzed using an acid, but typically base catalyzed reactions are used due to faster reaction rates.

The fatty acid methyl esters typically produced for use in diesel fuel have a number of drawbacks. For example, fatty acid methyl esters having saturated carbon chains of about $C_{14}$ to about $C_{20}$ in length and that boil in the diesel range typically have poor cold flow properties. On the other hand, unsaturated fatty acid methyl esters having carbon chains of about $C_{14}$ to about $C_{20}$ in length typically have acceptable cold flow properties but are more susceptible to oxidation. Thus, more suitable compounds for use as biodiesel would be desirable.

U.S. Pat. No. 5,840,942 describes a method for adding aryl hydrocarbons across an olefin in a fatty acid or fatty ester. The addition of the aromatic group is catalyzed using a clay or zeolite with acidic properties. The reaction is carried out at pressures of 50 psig to 200 psig (350 kPag to 1.4 MPag).

U.S. Pat. No. 5,034,161 describes a method for adding aryl hydrocarbons across an olefin in an aliphatic hydrocarbon. The addition of the aromatic group is catalyzed using a super-acid.

Japanese Published Patent Application No. 06-313188 describes a method for producing fatty acid esters from triglycerides. The triglyceride is exposed to an alcohol in the presence of a solid acid catalyst. Reaction pressures at or near atmospheric pressure are described.

U.S. Pat. No. 7,488,837 describes methods for forming a fatty acid alkyl ester. One of the methods involves exposing a vegetable oil to alcohol in the presence of a resin foamed article that incorporates acidic functionality. Sulfonic acid groups are mentioned as a possible acid functionality for the resin foam. Temperatures from 50° C. to 120° C. and reaction pressures near atmospheric pressure are described.

U.S. Pat. No. 5,426,199 describes a method for preferentially forming esters rather than ethers during reaction of organic acids or esters with alcohols. The method includes exposing the organic acid or ester to the alcohol in the presence of vinylaromatic polymer beads that have been modified on the surface to include acidic functionality. Sulfuric acid and chlorosulfonic acid are mentioned as functionalizing agents for the beads. The interior of the beads is not functionalized. With regard to reaction conditions, temperatures below 130° C. are described due to the stability of the beads, and pressures near atmospheric are described.

U.S. Pat. No. 5,003,124 describes a method for reacting $C_4$ or $C_5$ olefins with $C_1$ to $C_6$ alcohols in the presence of an acid functionalized vinylaromatic bead catalyst. The process is described as causing oligomerization and etherification. The process is conducted at the boiling point of the reaction mixture.

U.S. Published Patent Application No. 2007/0142690 describes a process for making a distillate fuel or lubricant composition. The process includes reacting a $C_5$ or larger olefin with an isoparaffin in the presence of an ionic liquid catalyst.

SUMMARY OF THE INVENTION

In an embodiment, a method is provided for producing a diesel boiling range product. The method includes exposing, in a batch reactor, a bio-component feed containing at least about 50% by weight of glycerides to an alcohol having about 7 carbons or less in the presence of a catalyst having an acid number of about 0.1 mg/g KOH to about 30 mg/g KOH under effective conditions to produce alkoxylated fatty acid alkyl esters. The alkoxylated fatty acid alkyl esters can be separated from the alcohol to form a fatty acid alkyl ester product that boils in the diesel range. The resulting fatty acid alkyl ester reaction product can advantageously have a cloud point that is at least 2° C. lower than the cloud point of a reaction product containing the corresponding unsaturated fatty acid alkyl esters.

In another embodiment, a method is provided for producing a diesel boiling range product. The method includes exposing, in a batch reactor, a bio-component feed containing at least about 50% by weight of triglycerides to an alcohol having 4 carbons or less in the presence of a solid catalyst having an acid number of about 5 mg/g KOH to about 30 mg/g KOH under effective conditions, the effective conditions including a pressure of at least about 350 kPag and a temperature of at least about 200° C., to produce alkoxylated fatty acid alkyl esters. The solid catalyst can be separated from the alkoxylated fatty acid alkyl esters. The alkoxylated fatty acid alkyl esters can also be separated from the alcohol. The separations can advantageously result in formation of a fatty acid alkyl ester reaction product that boils in the diesel range. The fatty acid alkyl ester reaction product can also advantageously have a cloud point that is at least 5° C. lower than the cloud point of a reaction product containing the corresponding unsaturated fatty acid alkyl esters.

BRIEF DESCRIPTION OF THE DRAWINGS

FIG. 1 schematically shows a reaction according to an embodiment of the invention.

DETAILED DESCRIPTION OF THE EMBODIMENTS

In various embodiments, a method is provided for the efficient conversion of glycerides such as triglycerides to diesel boiling range compounds. This is achieved using a process that reacts a (tri)glyceride compound with a suitable alcohol. One triglyceride reaction that occurs is transesterification, which results in formation of fatty acid alkyl esters and glycerol. Another action is alkoxylation of some or all double bonds in the long carbon chain tails of the triglyceride. These two reactions can occur in any order during the process. The fatty acid alkyl esters formed during this process can correspond to a diesel boiling range product. In preferred embodiments, the fatty acid alkyl esters formed during a process can have few or no olefinic bonds.

Two areas of concern for biodiesel include cold flow properties and storage/thermal stability. Conventional processes for producing biodiesel from triglycerides typically involve transesterification, such as transesterification with methanol to form Fatty Acid Methyl Ester (FAME). Some FAME varieties, such as canola methyl ester, have a relatively lower cloud point ($-3°$ C.) than other fatty acid methyl esters such as tallow methyl ester ($+14°$ C.). The reduced cloud point of FAME varieties like canola methyl ester is believed to be due in part to having larger amounts of olefinic bonds in the fatty acid portion of the molecules. Examples of such FAME molecules can include, for example, methyl oleate and methyl linoleate. By contrast, tallow methyl ester, which can often represent a mixture of fatty acid methyl esters, can tend to include a larger amount of saturated carbon chains.

Although olefinic bonds in the fatty acid methyl ester backbone can improve low temperature properties, the olefinic bonds can also tend to reduce the oxidative stability of a biodiesel. Olefinic bonds can cause problems in both fuels and lubricants. For example, olefinic bonds can oligomerize leading to formation of "gum" deposits in the fuels. Olefinic bonds can also oxidize, which can be particular problem in lubricants. For example, oxidized biodiesel fuels could interact with lubricant additives through a "lube dilution" process and can impact significantly on the lubricant life.

One way of minimizing the above problems can be to hydrogenate some or all of the double bonds to produce a saturated fatty acid methyl ester such as methyl stearate. Methyl stearate is typically considered relatively stable but has a melting point of about 40° C., which makes it undesirable for fuel applications. A biodiesel fuel containing that comprises a large amount of methyl stearate, such as tallow methyl ester, can typically exhibit poor low temperature properties but improved oxidative stability. Biodiesel fuels containing other saturated methyl esters can also tend to exhibit relatively poor low temperature properties. In addition to providing less desirable low temperature properties, using hydrogen to saturate the olefinic bonds in FAME also requires a source of hydrogen, which can be expensive and tight in supply, particularly in refinery-based processes.

In various embodiments, the transesterification and alkoxylation processes described below can provide several advantages over other methods for forming a diesel boiling range product that includes fatty acid alkyl esters. The method can allow for production of fatty acid alkyl esters that have a reduced number of olefinic bonds, and preferably no olefinic bonds, in a single step process. Based on selection of suitable temperature and pressure conditions, as well as a suitable acid catalyst, the transesterification and alkoxylation processes can occur in the same reaction step. The method can also allow for ease of separation of the desired diesel boiling range product from the other reactants and catalysts. The acid catalyst, when solid, can be physically separated from the diesel boiling range product, such as by filtration, while any remaining alcohol and/or glycerol can be removed by distillation due to the large difference in boiling point. Additionally, the method does not require the use strong liquid acids, such as sulfuric acid, thus reducing the hazard level and/or the amount of potential associated waste disposal issues. In various embodiments, the resulting products can have the advantage of having improved low temperature properties while also having a reduced tendency to polymerize or "gum".

FIG. 1 shows an example of a reaction according to an embodiment of the invention. In FIG. 1, a triglyceride reactant is shown having three different types of carbon side chains. In two of the side chains, olefinic bonds are present. After reaction of the triglyceride with an alcohol in the presence of an acidic catalyst, three fatty acid alkyl esters are produced, as well as glycerol. The long carbon side chain in each of the fatty acid alkyl esters corresponds to one of the carbon side chains from the triglyceride reactant. However, for the carbon side chains in the reactant that included one or more olefinic bonds, the olefinic bonds have been eliminated due to addition of an alkoxy group.

Feedstock/Reactants

As used herein, a "bio-component feedstock" refers to a hydrocarbon feedstock (typically also containing some oxygen atoms) derived from a biological raw material component, such as vegetable fats/oils and/or animal fats/oils (including algae and fish fats/oils, respectively). Note that for the purposes of this document, vegetable fats/oils refer generally to any plant based material, and include pyrolysis oils and fat/oils derived from a source such as plants from the genus *Jatropha*. The vegetable oils, animal fats, and algae fats/oils that can be used in the present invention can advantageously include any of those which comprise triglycerides and/or free fatty acids (FFA). The triglycerides and FFAs typically contain aliphatic hydrocarbon chains in their structure having from about 10 to about 26 carbons, for example from about 14 to about 22 carbons or preferably from about 16 to about 18 carbons. Other types of feed that are derived from biological raw material components include fatty acid esters, such as fatty acid alkyl esters (e.g., FAME and/or FAEE). Examples of bio-component feedstocks can include, but are not limited to, rapeseed (canola) oil, peanut oil, sunflower oil, tall oil, corn oil, soy oils, castor oil, jatropha oil, jojoba oil, olive oil, camelina oil, tallow fat/oil, flaxseed oil, palm oil, and the like, and combinations thereof. In various embodiments, the bio-component feed can contain at least about 50% by weight of triglycerides, for example at least about 75% by weight, at least about 90% by weight, or at least about 95% by weight.

In another embodiment, the bio-component feedstock can include monoglycerides, diglycerides, a combination of monoglycerides and diglycerides, or any of the above in combination with triglycerides. In embodiments where the feed includes monoglycerides and/or diglycerides, the monoglycerides and/or diglycerides can at least partially comprise hydrolysis products of triglycerides. Additionally or alternately, the monoglycerides and/or diglycerides can at least partially comprise by-products of a trans-esterification process. Of course, those of skill in the art will recognize that monoglycerides and/or diglycerides may also be formed during the course of the transesterification and alkoxylation processes according to various embodiments of the invention.

In this description, a glyceride is defined to include a monoglyceride, a diglyceride, a triglyceride, or any other type of polyglyceride. In embodiments where the feedstock includes glycerides, the glycerides can all be the same, or a mixture of glycerides can be present. Mixtures of glycerides can be mixtures due to the presence of monoglycerides, diglycerides, and/or triglycerides. Mixtures of glycerides can additionally or alternately be mixtures due to the presence of, for example, multiple types of monoglycerides, diglycerides, and/or triglycerides.

Bio-component feedstocks can often include a mixture of various types of glycerides (such as triglycerides) and/or fatty acids. The mixture of glycerides and/or fatty acids can include both saturated and unsaturated carbon chains. In an embodiment involving such a mixture, at least about 10 wt % of the glycerides and/or fatty acids include unsaturated carbon chains, for example at least about 20 wt %, at least about 30 wt %, or at least about 40 wt %. In another embodiment, about 85 wt % or less of the glycerides and/or fatty acids can include unsaturated carbon chains, for example about 75 wt % or less, about 65 wt % or less, or about 55 wt % or less. In an embodiment, the bio-component feedstock can be at least about 50% glycerides by weight, for example at least about 75% by weight or at least about 90% by weight. In a preferred embodiment, the glycerides can be triglycerides.

Bio-component based diesel boiling range feedstreams can typically have low nitrogen and sulfur content. For example, a bio-component based feedstream can contain up to about 300 parts per million by weight (wppm) nitrogen (in the form of nitrogen-containing compounds). Instead of nitrogen and/or sulfur, the primary heteroatom component in bio-component based feeds is oxygen (in the form of oxygen-containing compounds). Suitable bio-component diesel boiling range feedstreams can include up to about 10 wt % to about 12 wt % oxygen. In preferred embodiments, the sulfur content of the bio-component feedstream can advantageously be about 15 wppm or less, preferably about 10 wppm or less, although, in some embodiments, the bio-component feedstream can be substantially free of sulfur (e.g., can contain no more than 50 wppm, preferably no more than 20 wppm, for example no more than 15 wppm, no more than 10 wppm, no more than 5 wppm, no more than 3 wppm, no more than 2 wppm, no more than 1 wppm, no more than 500 wppb, no more than 200 wppb, no more than 100 wppb, no more than 50 wppb, or completely no measurable sulfur).

Another reactant employed in various embodiments is a short chain alcohol. Suitable alcohols include alcohols containing 1 to 7 carbons, preferably 1 to 4 carbons. Preferably, the alcohol is a primary alcohol. Examples of suitable alcohols can include, but are not limited to methanol, ethanol, ethylene glycol, n-propanol, isopropanol, n-butanol, isobutanol, t-butanol, iso-amyl alcohol, n-pentanol, methoxymethanol, methoxyethanol, ethoxymethanol, ethoxyethanol, and the like, and combinations thereof. In an embodiment, the alcohol preferably comprises methanol, ethanol, or a combination thereof.

Catalyst

In various embodiments, an acid catalyst can be provided by using a clay containing acidic functionality, such as K10™ Montmorillonite, commercially available from Fluka. Other examples can include Clarion 470™ or Clarion 550™, commercially available from American Colloid Company. Preferably, the clays can be solids and can be used in powder form.

More generally, a catalyst can be used that has an acid number from about 0.1 mg/g KOH to about 30 mg/g KOH. Preferably, the acid number can be from about 5 mg/g KOH to about 30 mg/g KOH. This acid number scale refers to the amount of KOH that is needed to neutralize the acid value of the clay. In other embodiments, the acid number can be at least about 0.1 mg/g KOH, for example at least about 0.5 mg/g KOH, at least about 2.5 mg/g KOH, at least about 5 mg/g KOH, or at least about 10 mg/g KOH. Additionally or alternately, the acid number can be about 30 mg/g KOH or less, for example about 25 mg/g KOH or less or about 20 mg/g KOH or less. Preferably, the catalyst comprises a solid, such as a clay or zeolite powder or resin beads. More preferably, the catalyst is a clay or zeolite powder. In embodiments where the catalyst comprises a solid, the specific surface area of the solid can be at least about 40 m$^2$/g, for example at least about 100 m$^2$/g or at least about 200 m$^2$/g. Additionally or alternately, the specific surface area of the solid can be about 350 m$^2$/g or less, for example about 300 m$^2$/g or less or about 250 m$^2$/g or less. In one preferred embodiment, the surface area of the solid catalyst can be from about 200 m$^2$/g to about 300 m$^2$/g.

Under some conditions, a membrane such as a Nafion® membrane (commercially available from DuPont) may also be usable. Nafion® is a tetrafluoroethylene co-polymer containing sulfonate groups. However, under more severe conditions, such as temperatures above about 200° C., Nafion® membranes may not have sufficient stability to be suitable for use.

Reaction Environment

In various embodiments, the reaction is preferably carried out in a batch environment, as opposed to a continuous flow environment. The reaction vessel can be an autoclave or other vessel capable of providing heat to the contents of the vessel and capable of operating at elevated pressures. Preferably, the reaction vessel can include a stirring mechanism. Conventional stirring methods are known to those of skill in the art.

In an embodiment, the acid catalyst and the alkoxy group source (e.g., the clay and the alcohol) can be introduced into the reaction vessel and can then be mixed and heated. The bio-component feed including triglycerides, such as vegetable oil, can then be introduced into the reaction vessel. The triglyceride feed can be added over a period of time, to allow for more complete reaction. The reaction products can then be filtered, e.g., to remove the clay catalyst. The reaction products can then be evaporated, e.g., to remove excess alcohol, leaving primarily the fatty acid alkyl ester product. Alternatively, the alcohol and bio-component feed can be added to the reaction vessel at the same time, or in another convenient order.

The temperature during the initial heating of the catalyst and alkoxy source can advantageously be similar to the temperature selected for the reaction with the triglyceride feed. The temperature can be from about 130° C. to about 250° C., or preferably about 200° C. or greater. In other embodiments, the temperature can be at least about 130° C., for example at least about 150° C., at least about 200° C., or at least about 220° C. Additionally or alternately, the temperature can be about 275° C. or less, for example about 250° C. or less or about 225° C. or less. The pressure can be from about 50 psig to about 400 psig (about 350 kPag to about 2.8 MPag). In various embodiments, the pressure can be at least about 50 psig (about 350 kPag), for example at least about 75 psig (about 520 kPag) or at least about 100 psig (about 690 kPa). Additionally or alternately, the pressure can be about 400 psig (about 2.8 MPag) or less, for example about 300 psig (about 2.1 MPag) or less, about 250 psig (about 1.7 MPag) or less, or about 200 psig (about 1.4 MPag) or less.

In an embodiment, the reaction pressure can be determined based on the vapor pressure of the alcohol used in the reaction. For example, the vapor pressure of methanol at about 150° C. is about 220 psi (about 1.5 MPa). In other embodiments, the total reaction pressure can be set separately from the vapor pressure of the individual liquid components in the reaction.

The reaction time can vary from about 0.5 to about 8 hours, depending on the conditions and reactants. In other embodiments, the reaction time can be at least about 0.5 hours, for example at least about 1 hour or at least about 2.5 hours. Additionally or alternately, the reaction time can be about 7 hours or less, for example about 6 hours or less, about 5 hours or less, or about 4 hours or less. One method for tracking the progress of the reaction can be to use Fourier Transform Infrared Spectroscopy (FTIR) to monitor the ether peaks in the range from 1070 cm$^{-1}$ to about 1210 cm$^{-1}$.

After the reaction is sufficiently and/or substantially complete, the desired product can be separated from the alcohol and the acidic solids by any convenient method. For example, a clay or zeolite powder can be separated from the product by filtration. The acidic solids can then be rinsed with the alcohol to wash off any product still remaining in the solids, with the rinsing alcohol added to the product. The product can then be separated from the alcohol by any convenient method, such as distillation. For example, the alcohol will typically have a boiling point of less than about 100° C., while the product can advantageously boil in the diesel range (from about 175° C. to about 350° C., preferably at least about 230° C.).

Reaction Products

In various embodiments, the resulting products can have improved low temperature properties relative to a saturated, non-alkoxylated fatty acid, while also having a reduced tendency to polymerize. Examples of low temperature properties can include, but are not limited to, cloud point and pour point.

In an embodiment, the reaction of the bio-component feed containing triglycerides with the alcohol in the presence of the suitable acidic catalyst can result in a mixture of alkoxylated fatty acid alkyl esters. The nature of the mixture of alkoxylated esters produced can be dependent on several factors. First, any differences in the three carbon chain tails in the original triglycerides will generally result in corresponding differences in the fatty acids portions of the alkoxylated fatty acid alkyl esters. The differences in the carbon chains from the triglycerides can be due to variations within a particular type of feed, such as variations in the carbon chains present within soybean oil, palm oil, tallow fat/oil, etc. The differences can also be due to the use of blends of different types of bio-component feeds.

Another source of variation within the alkoxylated fatty acid alkyl esters can be due to the alkoxylation of any double bonds in the carbon chains. Some variations will be positional variations, due to the alkoxy group being able to add to either carbon participating in an olefinic bond. Unless steric effects dictate addition at a particular carbon position or in a particular stereochemistry, addition of the alkoxy groups should lead to production of isomers which are statistically substituted at different carbon positions as well as possibly stereoisomers. If only partial alkoxylation of the fatty acid ester occurs, there may also be differences between the fatty acid alkyl esters that are fully alkoxylated versus those that still contain some olefinic bonds.

In various embodiments, the fatty acid alkyl esters produced by the reaction can be characterized in terms of the number of olefinic bonds that are alkoxylated during the reaction, relative to the number of olefinic bonds in the initial carbon chains of the triglyceride reactant. Relative to the number of olefinic bonds in the reactants, at least about 50% of the olefinic bonds can be alkoxylated, or at least about 75%, or at least about 90%, or at least about 95%. In embodiments where at least about 95% of the olefinic bonds are alkoxylated (preferably at least about 98% or at least about 99%), the reaction products can be referred to as being substantially alkoxylated.

The at least partially alkoxylated fatty acid alkyl esters produced according to the methods described above can have a variety of advantages relative to the fatty acid alkyl esters formed by other processes. Addition of an alkoxy group at olefinic bond positions in a fatty acid alkyl ester can lead to an improvement in cold flow properties. Addition of the alkoxy group at an olefin site also results in the elimination of the olefin, thus reducing the likelihood of forming a gum due to polymerization.

Preferably, the alcohol used for the transesterification and alkoxylation is a primary alcohol, such as methanol, ethanol, or n-propanol. Alcohols with longer carbon chains could potentially also be used. However, addition of side chains larger than about 7 carbons to the fatty acid alkyl ester can lead to lower fuel volatility and lower cetane number.

As an example of the type of improvement possible in low temperature properties, comparisons can be made between various types of molecules. Alkoxylating an organic molecule at olefinic bonds can be analogized to adding branches to the molecule. When methyl branches are added at an olefinic bond, removing the olefin does not change the number of carbons, while adding a methyl group adds one carbon per group. Therefore, one type of comparison could be to compare the difference between $C_{18}$ molecules, either with or without saturation, and corresponding molecules with higher carbon numbers that include branching.

As an example, a $C_{18}$ unbranched alkane can have a cloud point of about 31° C. If one methyl branch is added to the $C_{18}$ alkane (thus making an alkane with 19 total carbons), the cloud point should be about −59° C. If 2 methyl branches are added to the $C_{18}$ alkane (thus making an alkane with 20 total carbons), the cloud point should be about −65° C. Thus, even though carbons have been added to the chain, the presence of branching in the chain results in depression of the cloud point by about 90° C. (1 branch) or about 95° C. (two branches). Although the cloud point depression shown described here is for alkanes, a similar depression should be observed for a fatty acid alkyl ester. Thus, in an embodiment, the alkoxylated fatty acid alkyl esters of the claimed invention can have a cloud point that is at least 50° C. lower than the cloud point of the corresponding saturated fatty acid alkyl ester, for example at least about 75° C. lower or at least about 85° C. lower.

With regard to saturated versus unsaturated fatty acids, methyl stearate is a saturated fatty acid ester with an 18 carbon main chain and a one carbon ester. The pour point of methyl stearate is about 40° C. Methyl linoleate also has a $C_{18}$ main chain and a one carbon ester, but the chain includes 2 olefinic bonds. The pour point of methyl linoleate is about −35° C. Thus, the inclusion of the 2 olefinic bonds provides a pour point reduction of about 75° C. It is believed that the cloud points for these $C_{18}$ fatty acid esters should scale in a similar manner. For clarity, when a fatty acid ester molecule is specified as a "$C_{xx}$" fatty acid ester, what is meant is that "xx" is the number of carbons on the carbon side of the ester, i.e., in the main chain, including the carboxylate carbon attached to the two oxygen atoms, whereas the ester carbons are not included in the "$C_{xx}$" and are the carbons on the oxygen side of the ester, i.e., in the ester chain, stopping at the carboxylate oxygen.

Based on the above examples, the alkoxylated fatty acid alkyl esters are also expected to have low temperature properties similar to or better than the low temperature properties of a corresponding unsaturated fatty acid alkyl ester. Again, a corresponding unsaturated fatty acid alkyl ester will have fewer carbons than the alkoxylated fatty acid alkyl ester, due to the carbons added at the olefinic bond sites. However, the alkoxylated fatty acid alkyl ester also tends to have the advantage of improved stability relative to a similar unsaturated fatty acid alkyl ester. In an embodiment, an alkoxylated fatty acid alkyl ester exhibits a cloud point that is at least about 5°

C. lower than the cloud point of the corresponding unsaturated fatty acid alkyl ester, for example at least about 10° C. lower, at least about 15° C. lower, or at least about 20° C. lower.

The above comparisons have focused on comparisons of the low temperature properties of corresponding molecules. However, for many types of bio-component feeds, the feed can be composed of a mixture of saturated and unsaturated fatty acids. When such a feed is used according to an embodiment of the invention, the resulting fatty acid alkyl esters can be a mixture of alkoxylated fatty acid alkyl esters and saturated fatty acid alkyl esters.

The cloud point properties of a fatty acid alkyl ester mixture will typically be dependent on the particular mixture. Typical bio-component feed sources could contain from about 10% to about 90% by weight of unsaturated molecules. For mixtures containing lower amounts of unsaturated molecules, the cloud point depression benefits of this invention are believed to be correspondingly less. In an embodiment, a mixture of alkoxylated fatty acid alkyl esters and saturated fatty acid alkyl esters produced according to an embodiment of the invention can have a cloud point that is at least about 2° C. lower than the cloud point of the corresponding mixture of unsaturated and saturated fatty acid alkyl esters, for example at least about 5° C. lower, at least about 7° C. lower, at least about 10° C. lower, at least about 15° C. lower, or at least about 20° C. lower. In another embodiment, a mixture of alkoxylated fatty acid alkyl esters and saturated fatty acid alkyl esters produced according to an embodiment of the invention can have a cloud point that is at least about 5° C. lower than the cloud point of the corresponding mixture of saturated fatty acid alkyl esters, for example at least about 15° C. lower, at least about 25° C. lower, or at least about 35° C. lower.

Additionally or alternately, the present invention includes the following embodiments.

Embodiment 1. A method for producing a diesel boiling range product, comprising: exposing, in a batch reactor, a bio-component feed containing at least about 50% by weight of glycerides to an alcohol having about 7 carbons or less in the presence of a catalyst having an acid number of about 0.1 mg/g KOH to about 30 mg/g KOH under effective conditions to produce alkoxylated fatty acid alkyl esters; and separating the alkoxylated fatty acid alkyl esters from the alcohol to form a fatty acid alkyl ester product that boils in the diesel range, wherein the fatty acid alkyl ester reaction product has a cloud point that is at least 2° C. lower than the cloud point of a reaction product containing the corresponding unsaturated fatty acid alkyl esters.

Embodiment 2. A method for producing a diesel boiling range product, comprising: exposing, in a batch reactor, a bio-component feed containing at least about 50% by weight of triglycerides to an alcohol having 4 carbons or less in the presence of a solid catalyst having an acid number of about 5 mg/g KOH to about 30 mg/g KOH under effective conditions, the effective conditions including a pressure of at least about 350 kPag and a temperature of at least about 200° C., to produce an alkoxylated fatty acid alkyl ester; separating the solid catalyst from the alkoxylated fatty acid alkyl ester; and separating the alkoxylated fatty acid alkyl ester from the alcohol to form a fatty acid alkyl ester reaction product that boils in the diesel range, wherein the fatty acid alkyl ester reaction product has a cloud point that is at least 5° C. lower than the cloud point of a reaction product containing the corresponding unsaturated fatty acid alkyl esters.

Embodiment 3. The method of embodiment 1, wherein the catalyst is a solid.

Embodiment 4. The method of embodiment 2, further comprising separating the solid catalyst from the alkoxylated fatty acid alkyl esters.

Embodiment 5. The method of one of embodiments 1, 3, or 4, wherein the catalyst has an acid number of about 5 mg/g KOH to about 30 mg/g KOH.

Embodiment 6. The method of any of the previous embodiments, wherein the catalyst has a specific surface area of about 40 $m^2/g$ to about 300 $m^2/g$, for example of about 200 $m^2/g$ to about 300 $m^2/g$.

Embodiment 7. The method of any of the previous embodiments, wherein the effective conditions include a pressure of about 350 kPag to about 2.8 MPag and a temperature of about 130° C. to about 250° C.

Embodiment 8. The method of any of the previous claims, wherein the bio-component feed is exposed to the alcohol in the presence of the catalyst for about 1 to about 5 hours.

Embodiment 9. The method of embodiment 8 or embodiment 9, wherein the temperature is at least about 200° C., the pressure is at least about 690 kPa, or both.

Embodiment 10. The method of any of the previous embodiments, wherein the bio-component feed includes at least about 90% by weight of glycerides.

Embodiment 11. The method of any of the previous embodiments, wherein the feedstock is composed of a single glyceride.

Embodiment 12. The method of any of the previous embodiments, wherein the reaction product includes alkoxylated fatty acid alkyl esters having different numbers of carbon atoms.

Embodiment 13. The method of any of the previous embodiments, wherein the reaction product includes alkoxylated fatty acid alkyl esters having different numbers of alkoxy groups.

Embodiment 14. The method of any of the previous embodiments, wherein the fatty acid alkyl ester reaction product has a cloud point that is at least 7° C. lower, preferably at least 10° C. lower, than the cloud point of a reaction product containing the corresponding unsaturated fatty acid alkyl esters.

Embodiment 15. The method of any of the previous embodiments, wherein the bio-component feed includes from about 10% to about 85% by weight of glycerides, preferably comprising triglycerides, and/or fatty acids having unsaturated carbon chains.

Proposed Example

Into a 1 liter stirred tank autoclave about 100 gm K10™ Montmorillonite is charged along with 250 mL of methanol. The mixture is heated to about 150° C. Then about 50 gm of canola oil can is added over a period of about 1 hour. The reaction mixture is stirred at about 150° C. and about 220 psig (1.5 MPag) pressure for about 3 hours to about 6 hours. The reaction progression is monitored by withdrawing samples (such as 1 gram samples) of the liquid and analyzing by FTIR. At the completion of the run, the autoclave is cooled down to ambient temperature (approximately 20-25° C.). The pressure should return to roughly atmospheric (about 0 psig). The reaction mixture is then filtered, e.g., through a Whitman No. 1™ filter paper. The clay is washed with methanol. The washings and reaction mixture are evaporated under vacuum to remove the excess alcohol. The resulting product is purified and analyzed by standard techniques.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A method for producing a diesel boiling range product, comprising:

exposing, in a batch reactor, a bio-component feed containing at least about 50% by weight of glycerides to an alcohol having about 7 carbons or less in the presence of a catalyst having an acid number of about 0.1 mg/g KOH to about 30 mg/g KOH and a specific surface area of about 40 $m^2/g$ to about 300 $m^2/g$, under effective conditions to produce alkoxylated fatty acid alkyl esters; and separating the alkoxylated fatty acid alkyl esters from the alcohol to form a fatty acid alkyl ester product that boils in the diesel range, wherein the fatty acid alkyl ester reaction product has a cloud point that is at least 2° C. lower than the cloud point of a reaction product containing the corresponding unsaturated fatty acid alkyl esters.

2. The method of claim 1, wherein the catalyst is a solid.

3. The method of claim 2, further comprising separating the solid catalyst from the alkoxylated fatty acid alkyl esters.

4. The method of claim 1, wherein the catalyst has an acid number of about 5 mg/g KOH to about 30 mg/g KOH.

5. The method of claim 1, wherein the catalyst has a specific surface area of at least about 200 $m^2/g$.

6. The method of claim 1, wherein the effective conditions include a pressure of about 350 kPag to about 2.8 MPag and a temperature of about 130° C. to about 250° C.

7. The method of claim 6, wherein the bio-component feed is exposed to the alcohol in the presence of the catalyst for about 1 to about 5 hours.

8. The method of claim 6, wherein the temperature is at least about 200° C.

9. The method of claim 6, wherein the pressure is at least about 690 kPa.

10. The method of claim 1, wherein the bio-component feed includes at least about 90% by weight of glycerides.

11. The method of claim 1, wherein the feedstock is composed of a single glyceride.

12. The method of claim 1, wherein the reaction product includes alkoxylated fatty acid alkyl esters having different numbers of carbon atoms.

13. The method of claim 1, wherein the reaction product includes alkoxylated fatty acid alkyl esters having different numbers of alkoxy groups.

14. The method of claim 1, wherein the fatty acid alkyl ester reaction product has a cloud point that is at least 7° C. lower than the cloud point of a reaction product containing the corresponding unsaturated fatty acid alkyl esters.

15. The method of claim 1, wherein the bio-component feed includes from about 10% to about 85% by weight of glycerides and/or fatty acids having unsaturated carbon chains.

16. The method of claim 15, wherein the glycerides comprise triglycerides.

17. A method for producing a diesel boiling range product, comprising:

exposing, in a batch reactor, a bio-component feed containing at least about 50% by weight of triglycerides to an alcohol having 4 carbons or less in the presence of a solid catalyst having an acid number of about 5 mg/g KOH to about 30 mg/g KOH and a specific surface area of about 40 $m^2/g$ to about 300 $m^2/g$, under effective conditions, the effective conditions including a pressure of at least about 350 kPag and a temperature of at least about 200° C. to produce an alkoxylated fatty acid alkyl ester;

separating the solid catalyst from the alkoxylated fatty acid alkyl ester; and separating the alkoxylated fatty acid alkyl ester from the alcohol to form a fatty acid alkyl ester reaction product that boils in the diesel range, wherein the fatty acid alkyl ester reaction product has a cloud point that is at least 5° C. lower than the cloud point of a reaction product containing the corresponding unsaturated fatty acid alkyl esters.

18. The method of claim 17, wherein the fatty acid alkyl ester reaction product has a cloud point that is at least 10° C. lower than the cloud point of a reaction product containing the corresponding unsaturated fatty acid alkyl esters.

19. The method of claim 17, wherein the bio-component feed includes from about 10% to about 85% by weight of glycerides and/or fatty acids having unsaturated carbon chains.

* * * * *